Nov. 22, 1960                F. O. SEGER                2,960,961
             BRAKE CYLINDER PISTON OVERTRAVEL INDICATOR
Filed Dec. 24, 1958                          3 Sheets-Sheet 1

INVENTOR.
Fritz O. Seger
BY
Adelbert A. Steinmiller
Attorney

Nov. 22, 1960  F. O. SEGER  2,960,961
BRAKE CYLINDER PISTON OVERTRAVEL INDICATOR
Filed Dec. 24, 1958  3 Sheets-Sheet 2

INVENTOR.
Fritz O. Seger
BY
Adelbert O. Steinmiller
Attorney

Nov. 22, 1960  F. O. SEGER  2,960,961
BRAKE CYLINDER PISTON OVERTRAVEL INDICATOR
Filed Dec. 24, 1958  3 Sheets-Sheet 3
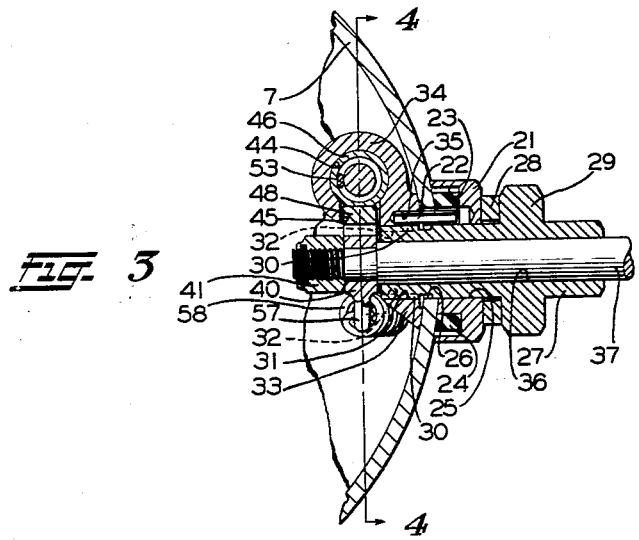
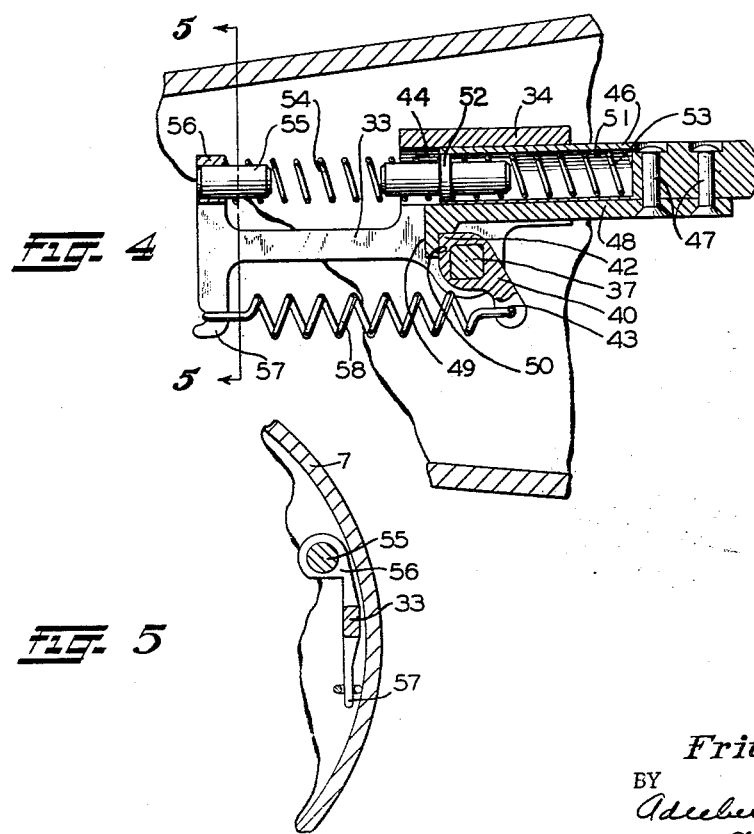
INVENTOR.
Fritz O. Seger
BY
Adelbert A. Steinmiller
Attorney United States Patent Office 2,960,961
Patented Nov. 22, 1960

2,960,961

BRAKE CYLINDER PISTON OVERTRAVEL INDICATOR

Fritz O. Seger, East McKeesport, Pa., assignor to Westinghouse Air Brake Company, Wilmerding, Pa., a corporation of Pennsylvania Filed Dec. 24, 1958, Ser. No. 782,690

5 Claims. (Cl. 116—127)

This invention relates to railway car brake cylinders and more particularly to signal means on the exterior of the brake cylinder for visibly indicating when the travel of the brake cylinder piston becomes excessive.

Fluid under pressure when supplied to a railway brake cylinder by the usual control valve device found on railway vehicles, acts on the brake cylinder piston to establish a force which is transmitted through the medium of a brake rigging to brake shoes which are forced against the treads of the vehicle wheels to effect a brake application.

The brake rigging comprises several links and levers which are connected to each other and to a brake cylinder push rod by means of pins which pass through bores in the links and levers. In order to provide a turning fit for these pins the diameters of the bores in the links and levers are slightly larger (only a few thousandths of an inch when new) than the outside diameter of the pins. Therefore, when a brake application is made, the pins connecting the links and levers move slightly within their respective bores as the result of the force or thrust transmitted from one link or lever to another through the pin. Forces of considerable magnitude are transmitted through the pins. Consequently the movement of the pins within their respective bores causes the pins to pound against the walls of the bores and this pounding, which occurs upon each brake application, causes wear which increases the diameter of the bores in the links and levers and decreases the diameter of the pins. Furthermore, as the diameters of the bores increase, the pins move a greater distance which has the effect of increasing the pounding and therefore the rate of wear of the walls of the bores. Consequently, after a large number of brake applications have been made, the resulting wear of the links, levers and pins develops an appreciable amount of slack in the brake rigging which is undesirable.

As slack develops in the brake rigging, the brake cylinder piston necessarily must travel a greater distance in moving from a brake release position to a brake applied position in order to bring the brake shoes into contact with the treads of the wheels of a railway vehicle. Accordingly, the travel of a brake cylinder piston to a brake applied position in excess of its normal travel is an indication that an undesirable slack condition has developed in the brake rigging.

Since overtravel of a brake cylinder piston is impossible to observe except by observation of the piston rod, which is difficult especially under poor lighting conditions, it is therefore desirable to have an indicating means outside the brake cylinder to give a clear visual indication to an observer of excessive piston travel.

According to this invention, there is provided for attachment to the non-pressure head of the usual brake cylinder carried on each railway vehicle, a novel indicating device which comprises a trip mechanism mounted within the non-pressure head, and a spring-biased indicating arm disposed exteriorly of the non-pressure head and operatively connected to the trip mechanism. The brake cylinder piston, due to overtravel incident to a brake application, contacts the trip mechanism and causes it to operate to release the spring-biased indicating arm for movement to a position in which it gives a visual indication that the piston has traveled an excessive amount.

At the time a train is made up in a railway yard, a test brake application is made on all cars in the train. A car inspector then walks the entire length of the train and inspects the brake equipment on all cars to determine that the equipment is functioning properly and that the brakes are applied on all cars. With brake cylinders on the cars equipped with the indicating device of the present invention, the car inspector may be readily and quickly apprised when inspecting the brake equipment of the brake cylinder piston overtravel condition and the consequent undesirable slack condition of the brake rigging, so that he may take the necessary steps to see that the condition is corrected.

In the accompanying drawings:

Fig. 3 is a cross-sectional view, taken along the line 3—3 of Fig. 2 and looking in the direction of the arrows, showing further structural details of the indicating device.

Fig. 4 is a cross-sectional view, taken along the line 4—4 of Fig. 3 and looking in the direction of the arrows, showing structural details of the trip mechanism, and Fig. 5 is a fragmentary sectional view, taken along the line 5—5 of Fig. 4 and looking in the direction of the arrows, showing additional details of the trip mechanism.

Description

Figure 1:
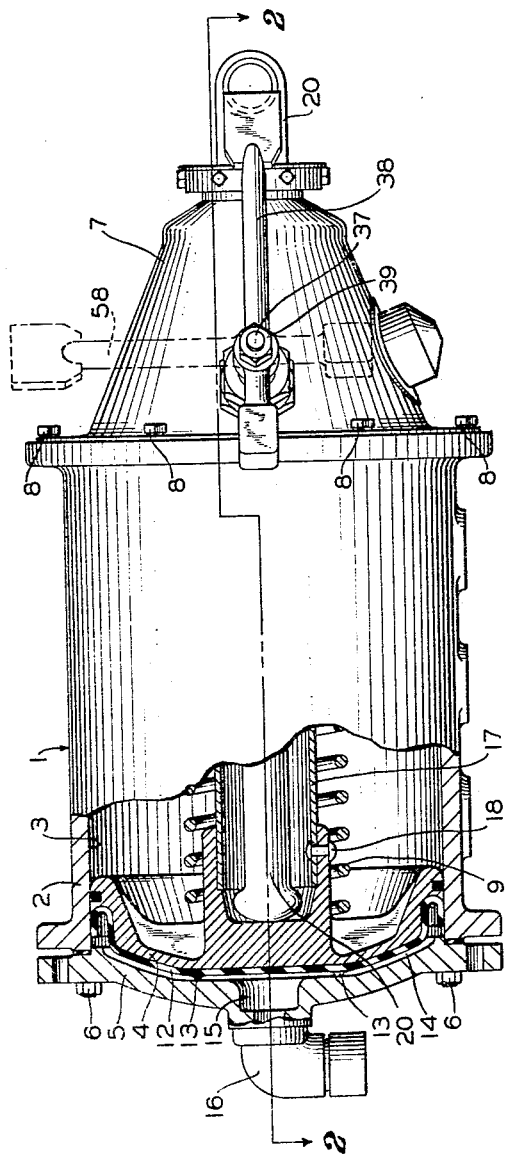
Fig. 1 is an elevational view, partly in section, of a railway vehicle brake cylinder embodying the novel indicating device, showing the indicating arm of the device in its normal position which it occupies until excessive wear develops in the brake rigging.

In Fig. 1 of the drawings there is shown a brake cylinder device 1 comprising a cylindrical body or casing section 2 which has a longitudinal bore 3 extending therethrough. A piston 4 is slidably mounted in the bore 3 which is closed at one end by a pressure head 5 secured to the casing section 2 by a plurality of bolts and nuts 6 and at the opposite end by a non-pressure head 7 secured to the casing section 2 by a plurality of bolts and nuts 8.

Figure 2:
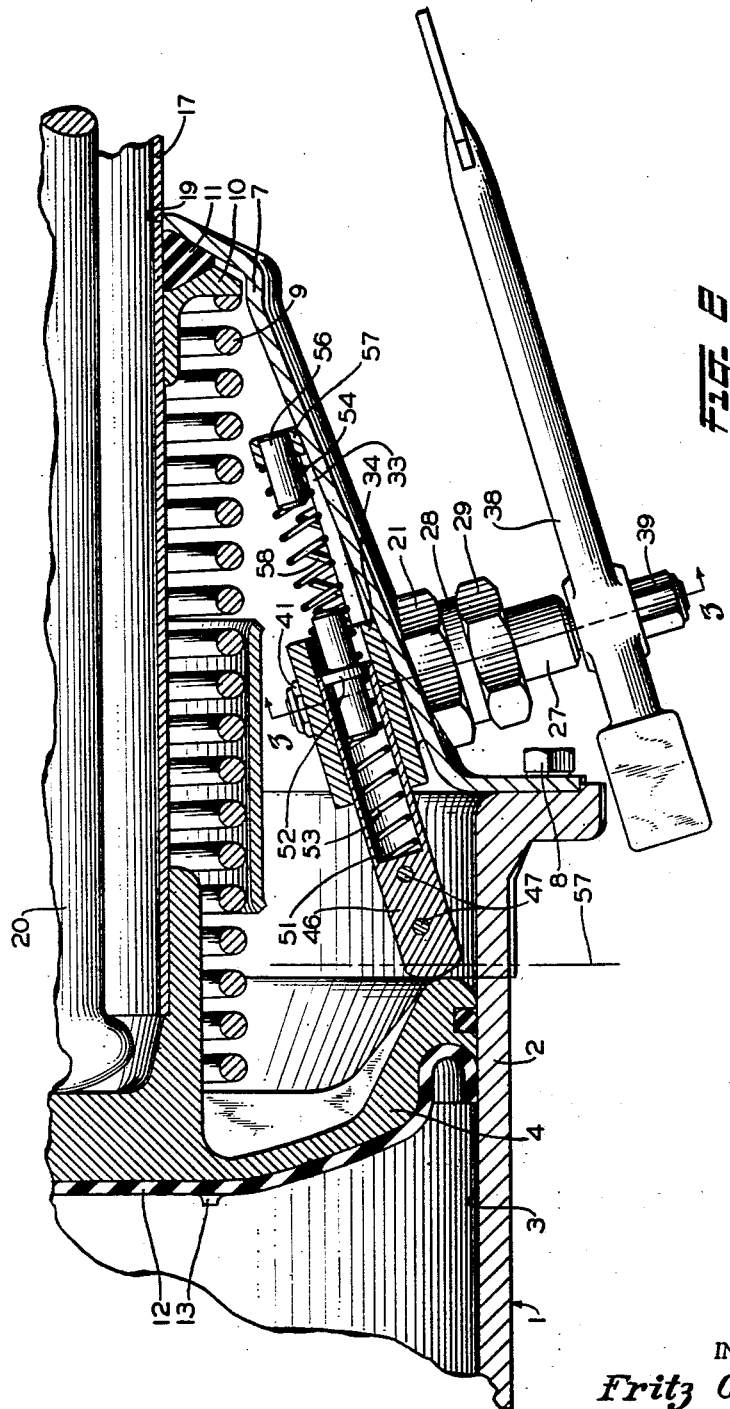
Fig. 2 is a partial horizontal cross-sectional view, along the line 2—2 of the brake cylinder shown in Fig. 1 in the direction of the arrows, showing a portion of a trip mechanism for the indicating device, and the position the piston of the brake cylinder occupies when the brakes are applied just prior to the development of excessive slack in the brake rigging.

A release spring 9 is interposed between the piston 4 and a spring seat 10 (Fig. 2) between which seat and the non-pressure head 7 is disposed a packing ring or seal 11. The release spring 9 serves to yieldingly bias the piston 4 in a brake releasing direction from a brake applied position in which it is shown in Fig. 2, to a brake release position in which it is shown in Fig. 1.

A packing cup 12 of the snap-on type is secured to the pressure face of the piston 4, and has several lugs 13 thereon which, when the piston 4 occupies its brake release position, contact the pressure head 5. A pressure chamber 14 is thus formed between the pressure head 5 and piston 4 to which fluid under pressure may be supplied through a port 15 and a pipe fitting 16. The pipe fitting 16 may be connected to the brake cylinder pipe of a brake control valve of the usual air brake system on railway vehicles.

One end of a hollow rod 17 is secured within a cylindrical boss at the center of the non-pressure face of the piston 4, as by several rivets 18, only one of which is shown in Fig. 1. Release spring 9 concentrically surrounds rod 17 which extends through an opening 19 in the non-pressure head 7 to the exterior thereof. Disposed within the hollow rod 17 is a push rod 20. The inner end of the push rod 20 abuts the piston 4 at the center thereof and the outer end is provided with a clevis to permit the push rod to be connected, as by a pin, to a brake lever (not shown) adjacent one end of the lever.

The novel indicating device comprising the present invention is mounted on and carried by the non-pressure head 7 and comprises a support collar 21 (Fig. 3) which is disposed on the outer periphery of the non-pressure head and is anchored thereto by a pin 22 which is press-fitted into the collar 21 and extends through the non-pressure head 7 to the interior thereof. The collar 21 is provided on the side thereof that abuts the periphery of the non-pressure head 7 with a groove or recess 23 in which is received a resilient gasket 24. The gasket 24 cooperates with the outer periphery of the non-pressure head 7 to prevent the entrance of dirt, rain and snow into the interior thereof through a bore 25 in the collar 21 and a coaxial bore 26 in the non-pressure head 7. A tubular housing 27 is provided which extends through a spacer collar 28, the collar 28 being disposed between a flange 29 on the housing 27 and the collar 21. The inner portion of the housing 27 that is within and adjacent the wall of the non-pressure head 7 is milled so as to form two oppositely disposed keys or ribs 30 which fit in a pair of correspondingly located keyways 31 milled or machined in the wall of a bore 32 in a flange 33 formed integral with and extending from a plunger housing 34. The right-hand face of the flange 33 has the same contour as the inside of the non-pressure head 7 so as to abut thereagainst and extend therealong as shown in Figs. 3 and 4, and is provided with a counterbore 35 in which is received the left-hand end of the pin 22. The left-hand face of the flange 33 is flat.

The housing 27 is provided with a bore 36 in which is rotatably mounted an operating shaft 37 the opposite ends of which extend beyond the ends of the housing. The two opposite ends of the shaft 37 are each provided with a square portion and a threaded portion which extend from the square portion to the respective end of the shaft.

An indicating arm 38 (see Figs. 1 and 2) is provided with a square hole near one end to permit the arm to be mounted on the square portion on the right-hand end of the shaft 37, as viewed in Fig. 3, and the arm 38 is retained on the shaft 37 by a nut 39 having screw-threaded engagement with the threaded portion of the shaft 37 adjacent said square portion.

A lever 40 (Figs. 3 and 4) provided with a square hole near one end is mounted on the square portion on the left-hand end of the shaft 37, as viewed in Fig. 3, and is retained on the shaft by a nut 41 having screw-threaded engagement with the threaded portion of the shaft adjacent said square portion. One end of the lever 40 is formed as a right-angle projection 42 and the opposite end is provided with a small bore 43.

The plunger housing 34 is provided with a bore 44 and a slot 45 opening into the bore. The slot 45 is so disposed that the right-hand side thereof is flush with the left-hand flat face of the flange 33. A plunger 46 is slidably mounted in the bore 44 in the plunger housing 34. Disposed within the slot 45 and secured to the plunger 46, as by a pair of rivets 47, is a locking member 48. The locking member 48 has at its left-hand end a downwardly extending finger 49 provided on one side with a right-angle recess 50.

The plunger 46 is provided at its left-hand end, as viewed in Fig. 4, with a counterbore 51 in which is slidably mounted a short piston 52 having smaller diameter extensions on each face thereof, to serve as a spring support or guide.

A first spring 53 is disposed in surrounding relation to the spring guide extending from the right-hand face of the piston 52 and between said face and the end of the counterbore 51. A second spring 54 is disposed in surrounding relation to the spring guide extending from the left-hand face of the piston 52 and a pin or spring guide 55 and between said face and a spring seat 56 into which the spring guide 55 is press fitted. The left-hand end of the flange 33, as viewed in Fig. 4, has a pair of oppositely extending arms disposed at right angles thereto, one arm constituting the spring seat 56 and the other a finger 57 to which is hooked one end of a tension spring 58. The opposite end of the tension spring 58 is hooked through the bore 43 in the lever 40 to render the spring 58 effective to rock the lever 40 clockwise upon movement of the finger 49 and locking member 48 in a left-hand direction from the position in which they are shown in Fig. 4 to a position in which the recess 50 in the finger 49 is out of the arc of movement of the projection 42 on the lever 40.

*Operation*

Let it be assumed that the brake cylinder device 1 is mounted on a railway vehicle and the push rod 20 is connected through a suitable brake rigging (not shown) to one or more brake heads each carrying a brake shoe of any suitable type. Let it be further assumed that the brake shoes are new and no slack exists in the brake rigging. Let it also be assumed that the chamber 14 formed between the brake cylinder pressure head 5 and the packing cup 12 is void of fluid under pressure and that the release spring 9 has moved the piston 4 to the position in which the lugs 13 on the packing cup 12 contact the pressure head 5. The piston 4, as it was moved in the direction of the left hand by the spring 9, allowed the force transmitted to the brake rigging through the push rod 20 to be released therefrom whereupon the brake heads and brake shoes, which are supported by brake hangers (not shown), were moved away from the railway vehicle wheels by the force of gravity to a release position in which they have normal clearance with respect to the tread of the car wheels.

In operation, when it is desired to effect a brake application, fluid under pressure is admitted to the pressure chamber 14 through the pipe fitting 16 which is connected to the brake controlling valve device of the usual air brake system on the railway vehicle. Fluid under pressure thus supplied to the chamber 14 is effective to move the piston 4 and push rod 20 in the direction of the right hand, as viewed in Fig. 1, against the yielding resistance of spring 9. As the piston 4 and push rod 20 are moved in the direction of the right hand, the force transmitted through the push rod to the brake rigging is effective to move the brake shoes into braking contact with the wheels of the railway vehicle.

Since it has been assumed that the brake shoes are new and that no slack exists in the brake rigging, when a brake application is made the piston 4 will travel from the release position in which it is shown in Fig. 1 to the position in which it is shown in Fig. 2. In traveling from the position in which the piston 4 is shown in Fig. 1 to the position in which the piston is shown in Fig. 2, the piston will move into contact with the left-hand end of the plunger 46 but will not displace the plunger and locking member 48 in the direction of the right hand to compress the springs 53 and 54 and move the recess 50 in the finger 49 away from the projection 42 on the lever 40. Consequently, the lever 40, shaft 37 and indicating arm 38 remain in the position in which they are shown in Figs. 4 and 1.

When it is desired to release the brake application, the fluid under pressure supplied to chamber 14 is vented in the usual manner to atmosphere through the pipe fitting 16 to the brake controlling valve device of the railway vehicle brake system, whereupon the force of spring 9 acting through the spring seat 10 and hollow rod packing seal 11 on the non-pressure head 7 moves the piston 4 in a brake releasing direction from the position in which it is shown in Fig. 2 back to the position in which it is shown in Fig. 1 back to the position in which it is shown in Fig. 1. As the piston 4 is thus moved back to its brake release position, the force transmitted through the push rod 20 and the brake rigging to the brake shoes is released and the brake shoes and brake heads are moved by the force of gravity away from the vehicle wheels to a brake release position. This movement of the brake shoes is transmitted through the brake rigging to cause the push rod 20 to follow the piston 4 until the piston and push rod reach their brake release position in which they are shown in Fig. 1.

If, after a number of brake applications, the brake shoes and brake rigging have worn to the extent that sufficient slack exists as to require, when a subsequent brake application is made, that the piston 4 travel from the position in which it is shown in Fig. 1 to a position to the right of the position in which it is shown in Fig. 2 and indicated by a broken line bearing the reference numeral 57, then the piston 4, after contacting the plunger 46, will move the plunger and locking member 48 far enough for the recess 50 in the finger 49 to be out of the arc of movement of the projection 42 on the lever 40. When the finger 49 is thus moved to the position in which the recess 50 therein is out of the arc of movement of the projection 42 on the lever 40, the tensioned spring 58 will effect rapid clockwise rocking of the lever 40 as viewed in Fig. 4, until the spring 58 assumes its free height position. As the lever 40 is thus rocked, it is effective to rotate the shaft 37 and the indicating arm 38 counterclockwise as viewed in Fig. 1, since both the lever 40 and arm 38 are mounted on square portions of the shaft 37, until the arm 38 assumes the vertical position shown by broken lines in Fig. 1 and indicated by the reference numeral 58.

The indicating arm 38 will remain in its vertical position until manually rocked back to its original horizontal position and re-secured in its cocked position. Therefore, if a car inspector inspects the brakes on a car and finds the indicating arm 38 in its vertical position, he will know that the piston travel of the piston of the brake cylinder on that car is excessive. Consequently, the inspector can take the necessary steps required to correct the defects in the brake equipment, such as worn brake shoes or excessive slack in the brake rigging, that have produced overtravel of the piston of the brake cylinder, when a brake application is made, in order to bring the brake shoes into contact with the tread of the wheels on the railway vehicle.

After the defects in the brake equipment have been eliminated by repair, or renewal, the indicating arm 38 can be manually rocked clockwise, as viewed in Fig. 1, back to its normal horizontal position. When the arm 38 is manually rocked back to its normal position, the lever 40 is rocked counterclockwise as viewed in Fig. 4, until it assumes the position in which it is shown in Fig. 4 since the arm 38 and lever 40 are both rigidly mounted on the shaft 37. As the lever 40 is manually rocked counterclockwise, the spring 58 is stretched under tension and the projection 42 on the lever 40 first contacts the right-hand side of the finger 49 above the recess 50 therein and then moves finger 49, locking member 48 and plunger 46 in the direction of the left hand, as viewed in Fig. 4, under the yielding resistance of springs 53 and 54 until the projection 42 snaps into the recess 50, in which position it is shown in Fig. 4, thus "cocking" the indicator arm 38 in horizontal position. Arm 38 will remain cocked in its normal horizontal position in which it is shown in Fig. 1 since the springs 53 and 54 are effective to bias the plunger 46, locking member 48 and finger 49 in the direction of the right hand, as viewed in Fig. 4, to maintain the projection 42 on the lever 40 within the recess 50 in the finger 49 and thereby lock the lever 40 against clockwise rocking by the spring 58 until the piston travel is again great enough for the piston 4 to contact the plunger 46 and move it in the direction of the left hand far enough for the finger 49 to trip the lever 40. Upon subsequent tripping of the lever 40, the spring 58 will again effect rocking of the indicating arm 38 from its horizontal to its vertical position to indicate overtravel of the piston of the brake cylinder.

Having now described the invention, what I claim as new and desire to secure by Letters Patent is:

1. The combination with a brake cylinder having a body, a pressure head, a non-pressure head, and a piston slidably mounted in a bore in the body and operative from a release position in one direction toward a brake application position, of a piston overtravel indicating device mounted on the non-pressure head and comprising a plunger housing having at one side a hollow flange mounted against the inside peripheral surface of the non-pressure head, a tubular housing extending through and secured to the wall of the non-pressure head, an operating shaft rotatively mounted in said tubular housing, an indicating arm rigidly mounted on the end of said shaft exterior to the non-pressure head, a lever rigidly mounted on the end of said shaft interiorly of the non-pressure head and having a projection at one end, a plunger slidably mounted in said plunger housing in a position to be in the path of movement of the piston, a locking finger on said plunger having a recess for receiving the projection on said lever therein in locking relation, biasing means normally urging said plunger in a direction in which the recess in said finger engages the projection on said lever, and biasing means operatively connected to said lever to rock said lever, shaft and arm to a position indicating piston overtravel upon movement of said plunger by the piston to a position in which the recess in said finger on said plunger is out of the path of movement of the projection on said lever.

2. A piston overtravel indicator device for a brake cylinder having a piston and a non-pressure head, said device comprising a rotary operating shaft extending through and rotatably mounted in the wall of the non-pressure head, an indicating arm rigidly mounted on the end of said shaft exterior to said non-pressure head, releasable locking means for locking said shaft and arm in a normal rotational position, and means operable in response to travel of the brake cylinder piston out of release position in excess of a certain distance to effect operation of said locking means to unlock said shaft and arm for rotation, and biasing means effective to rotate said shaft and arm to an overtravel indicating position.

3. A piston overtravel indicator device as claimed in claim 2, in which manual restoration of said indicating arm to its normal rotational position automatically restores said locking means to its position for locking said shaft and arm in their normal rotational positions.

4. A piston overtravel indicator device for a brake cylinder having a piston and a non-pressure head, said device comprising a rotary operating shaft extending through and supported by the non-pressure head, an indicating arm rigidly mounted on the end of the said shaft exterior to said non-pressure head, a lever rigidly mounted on the end of said shaft interiorly of the non-pressure head, said lever having a projection thereon, a plunger housing having at one side a hollow flange mounted against the inside peripheral surface of the non-pressure head, a locking plunger slidably mounted in said plunger housing, said locking plunger having a finger formed thereon, said finger having a recess therein, a first biasing means for biasing said plunger and finger to one position in which the projection on said lever engages in the recess in said finger to lock said shaft and arm in a normal position, and a second biasing means effective to rotate said shaft, arm and lever to an overtravel indicating position when they are freed for rotation, said locking plunger being effective when moved to a second position in which the said projection disengages said recess, to free said shaft, arm, and lever for rotation, said plunger being moved from its said one to its said second position by the brake cylinder piston upon the travel of the piston exceeding a chosen distance.

5. The combination with a brake cylinder having a body, a pressure head, a non-pressure head and a piston slidably mounted in a bore in the body and operative from a release position in one direction toward a brake application position, of a piston overtravel indicating device mounted on the non-pressure head and comprising a rotary operating shaft extending through and mounted in the wall of said non-pressure head, an indicating arm rigidly mounted on the end of said shaft external to said non-pressure head, a lever rigidly mounted on the end of said shaft interiorly of said non-pressure head, locking means mounted within the non-pressure head and movable from one position in which it cooperates with said shaft to lock said shaft and arm in a normal rotary position to a second position out of cooperative relation with said shaft in which it unlocks said shaft and arm for rotary movement, the piston contacting said locking means when the travel of the piston out of a release position toward an application position exceeds a chosen distance and thereafter operating said locking means from its said one to its said second position, and biasing means carried by said non-pressure head and connected to said lever to rock said lever, shaft and arm to a position indicating piston overtravel upon operation of said locking means to its said second position.

References Cited in the file of this patent

UNITED STATES PATENTS

| | | |
|---|---|---|
| 1,391,895 | Haskell | Sept. 27, 1921 |
| 2,137,495 | Kershaw | Nov. 22, 1938 |